United States Patent
Lee et al.

[11] Patent Number: 6,003,406
[45] Date of Patent: Dec. 21, 1999

[54] STEERING WHEEL HAVING A COLLAPSIBLE HUB

[75] Inventors: Ju-Young Lee, Ansan; Dong-Ho Park, Kunpo, both of Rep. of Korea

[73] Assignee: Hyundai Motor Company, Rep. of Korea

[21] Appl. No.: 08/982,234

[22] Filed: Dec. 1, 1997

[30] Foreign Application Priority Data

Nov. 29, 1996 [KR] Rep. of Korea ............... 96/59333

[51] Int. Cl.[6] .................. B62D 1/04; B62D 1/11; B60R 21/05; F16F 7/12
[52] U.S. Cl. .............. 74/552; 74/552; 280/750; 280/777; 188/371; 188/377
[58] Field of Search ............... 74/552; 280/750, 280/777; 188/371, 377

[56] References Cited

U.S. PATENT DOCUMENTS

| | | | |
|---|---|---|---|
| 3,992,041 | 11/1976 | Vernocchi | 74/552 X |
| 4,325,568 | 4/1982 | Clark et al. | 74/552 X |
| 4,368,454 | 1/1983 | Pilatzki | 74/552 X |
| 4,660,852 | 4/1987 | Katayama et al. | 280/750 |
| 4,932,284 | 6/1990 | Sakane | 74/552 |
| 4,939,951 | 7/1990 | Kaneko | 74/552 |
| 4,962,947 | 10/1990 | Nagata et al. | 74/552 X |
| 5,810,391 | 9/1998 | Werner et al. | 74/552 X |

*Primary Examiner*—Thomas R. Hannon
*Assistant Examiner*—Colby M. Hansen
*Attorney, Agent, or Firm*—Christie, Parker & Hale, LLP

[57] ABSTRACT

A steering wheel having a collapsible hub, the steering wheel comprising a wheel 100 having a rim 140, a plurality of spokes 130 connected with the rim 140 and a lower plate 150 having edges and connected with the spokes 130 at the middle of the wheel 100, the edges of the lower plate forming a shape of an open box; a back plate 200 fixed to the said plurality of spokes 130 of the wheel 100 and having an escape hole 220 opened from the middle to one side of the plate 200; an upper plate 300 having first and second vertical surfaces 320 and 330 fixed to the back plate 200 and a horizontal surface 340 connecting the vertical surfaces 320 and 330 to form a space between the back plate 200 and the upper plate 300; and a hub cover 400 installed on the wheel 100 for covering the upper plate 300, so the upper plate 300 collapses to absorb impact of a driver in a car accident.

4 Claims, 3 Drawing Sheets

STEERING WHEEL HAVING A COLLAPSIBLE HUB

FIELD OF THE INVENTION

This invention relates to a collapsible steering wheel for protecting a driver, and more particularly to a steering wheel having a collapsible hub used for a nonmounted air bag in a vehicle.

BACKGROUND OF THE INVENTION

Usually, an air bag system is mounted in a car as a subsidiary device to a seat belt and the air bag system comprises an air bag module having an air bag, a gas generator, a pat cover, a front impact sensor, a rotary contact switch, and a calculator.

Generally, the air bag module of the air bag system is installed in a steering wheel, so that a cavity is formed in a hub of a steering wheel for mounting the air bag module therein.

Therefore, steering wheels are manufactured differently according to a mounted air bag and a nonmounted air bag.

The air bag system is provided optionally in a vehicle since the system is expensive, so that there are many vehicles in which an air bag system is not installed.

General construction of a steering wheel for a nonmounted air bag is shown in FIG. 1 according to the prior art.

As shown in FIG. 1, a steering wheel 20 is made of hard materials and the steering wheel is mounted at an upper end of a steering shaft 10. A hub cover 30 made of a hard material is fixed at the center of the steering wheel 20.

In a car accident, the driver's head collides with the hub cover 30. However, the contact area of the driver's head and the steering wheel is small and the repelling force from the steering wheel is large, so that the steering wheel causes major injuries to a driver because the steering wheel 20 and the hub cover 30 are made of hard materials as described above.

Accordingly, it is an object of the present invention to provide a steering wheel having a collapsible hub used for a nonmounted air bag in a vehicle in which the hub of the steering wheel is so constructed as to absorb the impact of a driver in a car accident.

SUMMARY OF THE INVENTION

In accordance with one object of the present invention, there is provided a steering wheel having a collapsible hub, the steering wheel comprising: a wheel having a rim, a plurality of spokes connected with the rim, and a lower plate connected with the spokes at a middle of the wheel, the edges of the lower plate forming a shape of an open box; a back plate fixed to the spokes of the wheel and having an escape hole opened from the middle to one side of the plate; an upper plate having first and second vertical surfaces fixed to the back plate and a horizontal surface connecting the vertical surfaces to form a space between the back plate and the upper plate; and a hub cover installed on the wheel for covering the collapsible upper plate to absorb the impact of a driver in a car accident.

In accordance with another object of the present invention, there is provided a steering wheel wherein the first vertical surface of the upper plate has a plurality of holes and the horizontal surface of the upper plate has a plurality of holes at a lateral part neighboring the first vertical surface so that the upper plate collapses into the escape hole of the back plate.

BRIEF DESCRIPTION OF THE DRAWINGS

For fuller understanding of the nature and objects of the invention, reference should be made to the following detailed description taken in conjunction with the accompanying drawings in which.

DESCRIPTION OF THE PREFERRED EMBODIMENTS

Figure 1:
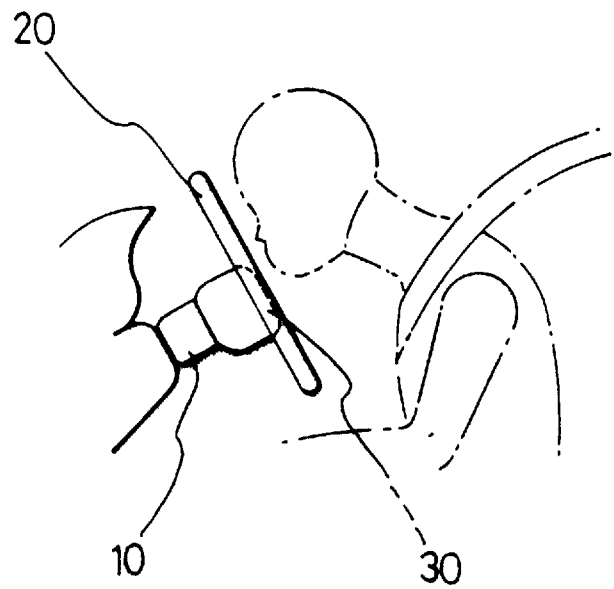
FIG. 1 is a schematic view showing a driver colliding with a steering wheel according to the prior art.
Figure 2:
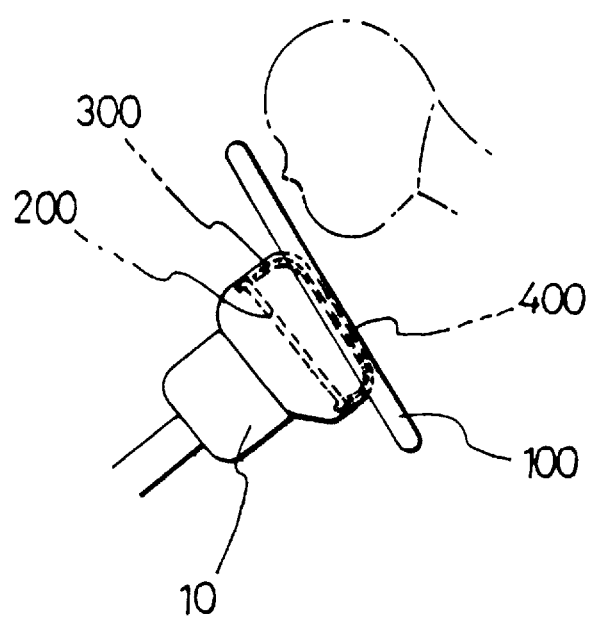
FIG. 2 is a schematic view similar to FIG. 1 showing a steering wheel according to the present invention when a driver collides with a steering wheel.
Figure 3:
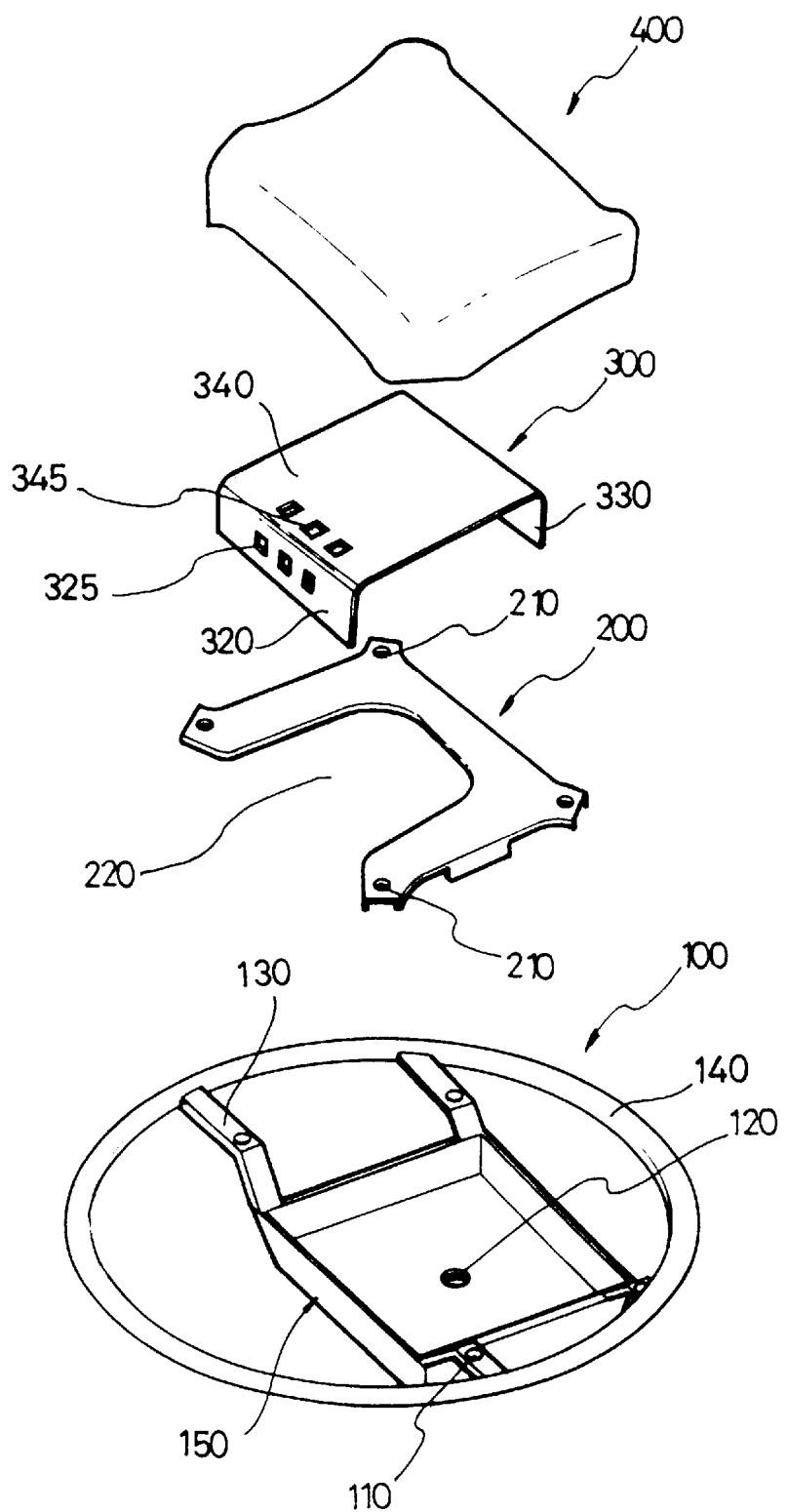
FIG. 3 is a perspective view of a disassembled steering wheel according to the present invention.

A preferred embodiment of the present invention will now be described in detail with reference to the accompanying drawings.

A steering wheel having a collapsible hub according to the present invention includes a wheel 100 in which a lower plate 150 is installed on spokes 130 in the middle of the wheel and an upper surface of the lower plate 150 is open and screw inserting holes 110 are formed on the spokes 130; a back plate 200 screw-coupled with the screw inserting holes 110 of the wheel 100; an upper plate 300 having a box-shape opened downward and fixed on the back plate 200; and a soft hub cover 400 installed on the wheel 100 for covering the upper plate 300.

A wheel 100 comprises a ring-shaped rim 140, a plurality of spokes 130 connected with the rim 140, and a lower plate 150 having a box shape in that the upper surface is open. The lower plate 150 is connected with the spokes 130 at the middle of the wheel 100. A screw inserting hole 110 is formed on each spoke 130 for fixing to the back plate 200. A center hole 120, for coupling an end of a steering column shaft, is formed on the center of the lower plate 150 installed fixedly on the spokes 130.

Figure 4:
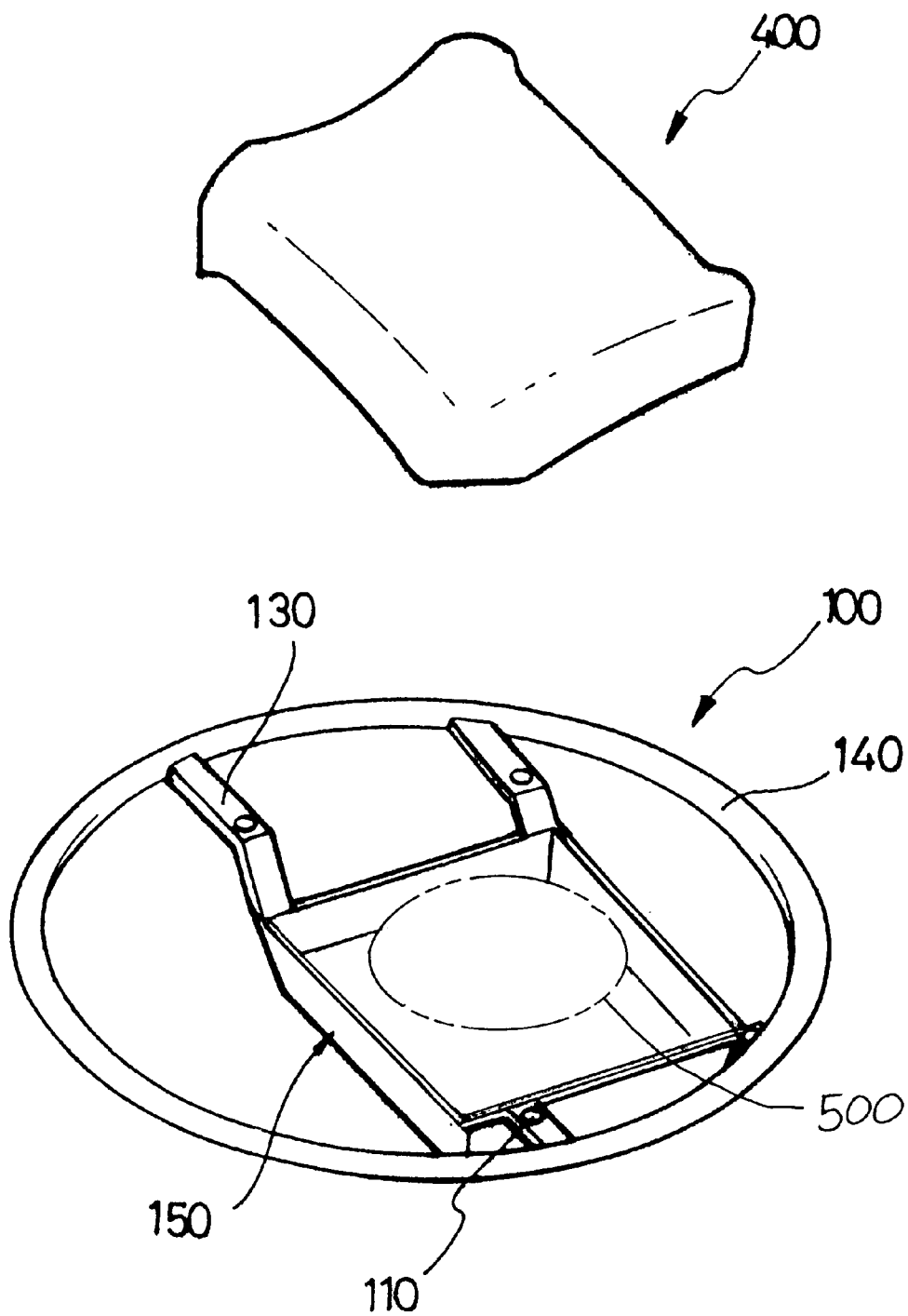
FIG. 4 is a perspective view of a disassembled steering wheel with an air bag shown schematically.

The above-described wheel 100 is similar to a general steering wheel used for a mounted air bag module, so that the present invention has a feature that provides a common steering wheel to be used for an air bag 500 mounted steering wheel and for an air bag non-mounted steering wheel. Air bag 500 in lower plate 150 is shown schematically in FIG. 4.

A back plate 200 is an upper plate supporting member. The back plate 200 has a plurality of screw holes 210 at positions corresponding to the screw inserting holes 110 formed at the spokes 130 of the wheel 100, and the back plate also has an escape hole 220 opened and extended from a middle to one lateral side of the back plate 200.

An upper plate 300 is a collapsible member fixed on the back plate 200 and will be collapsed to absorb impact of a driver in a car accident. The upper plate 300 comprises first and second vertical surfaces 320 and 330 welded on the back plate 200 and a horizontal surface 340 connecting the vertical surfaces 320 and 330; a space forms between the back plate 200 and the upper plate 300, as a result.

The first vertical surface 320 of the upper plate 300 and the neighboring lateral part of the horizontal surface 340 of the upper plate 300 are made thinner than the other parts of the upper plate 300. Also, these sections of the upper plate 300 are formed with a plurality of holes 325 and 345 such that these sections are weakened with respect to the other parts of the upper plate 300 and collapsible into the escape hole 220 of the back plate 200 while the upper plate 300 is collapsing.

A hub cover 400 installed on the steering wheel for covering the upper plate 300 contacts a driver in a car accident. For this reason, the hub cover 400 is made of soft materials which easily change shape, such as soft rubber.

The operation and effects of the steering wheel having a collapsible hub according to the present invention will now be described.

When there is a car accident and a driver collides with the steering wheel, the driver's head firstly collides with the hub cover 400 and the shape change of the hub cover 400 makes a large contacting area between the steering wheel and the driver to reduce the impacting force through the enlarged contacting area.

Further, if the impact is strong so the shape-changed hub cover 400 imparts impact to the upper plate 300, the upper plate 300 collapses into the escape hole 220 of the back plate 200 to absorb the impact forces.

Impact absorbing efficiency of the steering wheel can be determined and modified by changing the thickness of the first vertical surface 320 and the vertical surface 340 of the upper plate 300 or by changing the number and the size of the holes 325 and 345 formed at the first vertical surface 320 and at the vertical surface 340 of the upper plate 300.

As described above, a steering wheel having a collapsible hub can reduce the injuries of a driver in a car accident since the driver collides on the soft hub cover 400 and the collapsible upper plate 300 assembled with the supporting back plate 200.

Numerous modifications and variations of the present invention are possible in light of the above teachings. It is therefore to be understood the invention is defined by the scope of the appended claims, and the invention may be practiced in ways other than those in the intent and teachings of the invention.

What is claimed is:

1. A steering wheel having a collapsible hub, the steering wheel comprising:

a wheel having a rim, a plurality of spokes connected with the rim and a lower plate connected with the spokes in the middle of the wheel, said lower plate having edges forming a shape of an open box;

a back plate fixed to the spokes of the wheel and having an escape hole opened from the middle to one side of the plate, resulting in a u-shaped back plate;

an upper plate having first and second surfaces fixed to the back plate and a third surface substantially perpendicular to and connecting the first and second surfaces to form a space between the back plate and the upper plate, the upper plate being collapsible into the escape hole of the back plate; and a hub cover installed on the wheel for covering the upper plate.

2. The steering wheel as claimed in claim 1 wherein said first surface of the upper plate has a plurality of holes and said third surface of the upper plate has a plurality of holes at a lateral part adjacent to the first surface.

3. The steering wheel as claimed in claim 1 wherein a module air-bag system is interchangeable with the components of said steering wheel.

4. The steering wheel as claimed in claim 3 wherein said first surface of the upper plate has a plurality of holes and said third surface of the upper plate has a plurality of holes at a lateral part adjacent to the first surface.

\* \* \* \* \*